July 26, 1966     K. WARNECKE ET AL     3,262,483

APPARATUS FOR REMOVING THE SQUEEZE-OUT ON RUBBER PRODUCTS

Filed Dec. 21, 1964     2 Sheets-Sheet 1

Inventors:
Karl Warnecke
Hans Helmerding
Helmut Paul
By Walter Becker

July 26, 1966  K. WARNECKE ET AL  3,262,483
APPARATUS FOR REMOVING THE SQUEEZE-OUT ON RUBBER PRODUCTS
Filed Dec. 21, 1964  2 Sheets-Sheet 2

Inventors:
Karl Warnecke
Hans Helmerding
Helmut Paul
By
Walter Becker

United States Patent Office 3,262,483
Patented July 26, 1966

3,262,483
APPARATUS FOR REMOVING THE SQUEEZE-OUT ON RUBBER PRODUCTS
Karl Warnecke, Isernhagen NB.-Sud, Hans Helmerding, Hannover-Herrenhausen, and Helmut Paul, Lauenau, Deister, Germany, assignors to Continental Gummi-Werke Aktiengesellschaft, Hannover, Germany
Filed Dec. 21, 1964, Ser. No. 420,033
Claims priority, application Germany, Dec. 23, 1963, C 31,741
6 Claims. (Cl. 157—13)

The present invention relates to an apparatus for removing the squeeze-out on molded rubber products. It is known to cut off the squeeze-out on rubber products, especially pneumatic vehicle tires, by means of cutting blades or the like guided tangentially to the surface of the product from which the squeeze-out has to be cut off. With heretofore known apparatuses of the type involved, there exists the drawback that the cutting pressure exerted upon the cutting knives or the like bends the squeeze-out so that the cut is not effected along a straight or plane surface but instead is effected along an incline.

It is an object of the present invention to provide an apparatus for cutting off the squeeze-out on rubber products, especially vehicle tires, which will overcome the above mentioned drawback.

It is another object of this invention to provide an apparatus of the above mentioned type, which will be able to cut the squeeze-out on rubber products along a plane surface.

It is another object of this invention to provide an apparatus as set forth above, in which the cutting effect will be independent of the speed at which the cutting knife and the squeeze-out move relative to each other thereby increasing the life of the cutting knife and the safety against accidents.

These and other objects and advantages of the invention will appear more clearly from the following specification in connection with the accompanying drawings, in which.

Figure 1:
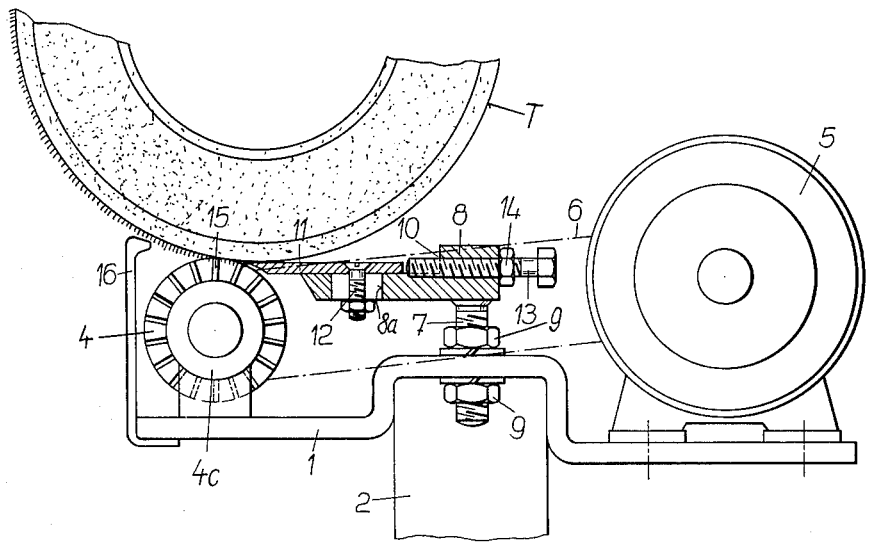
FIG. 1 illustrates a side view, partially in section, of an apparatus according to the present invention.
Figure 2:
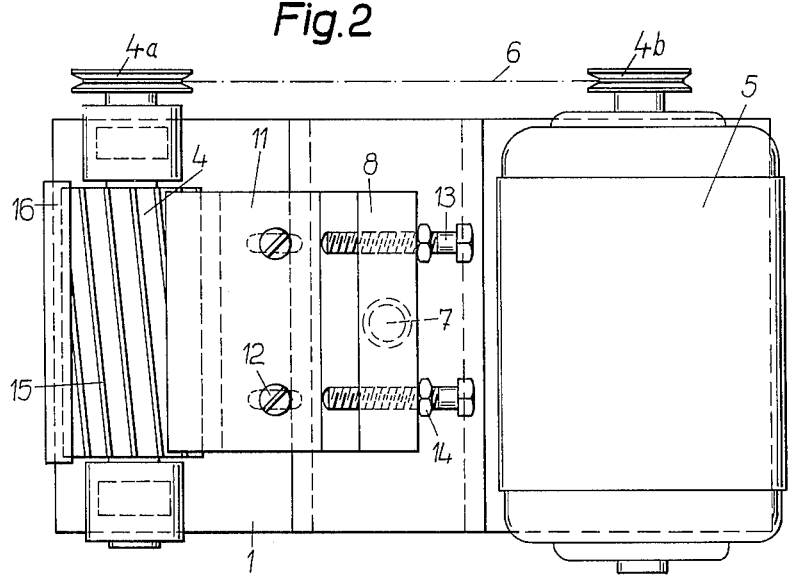
FIG. 2 shows a top view of the apparatus according to FIG. 1.
Figure 3:
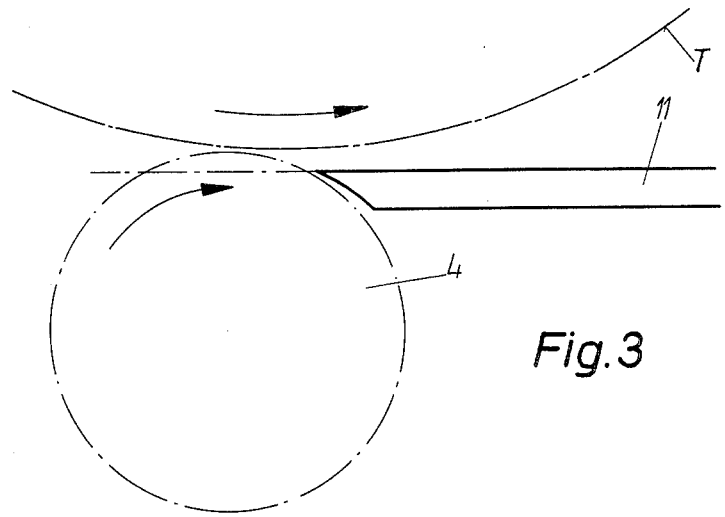

FIG. 3 diagrammatically illustrates on a larger scale than FIGS. 1 and 2 a first position of the product to be cut with regard to an auxiliary roller according to the invention and the cutting knife.

Figure 4:
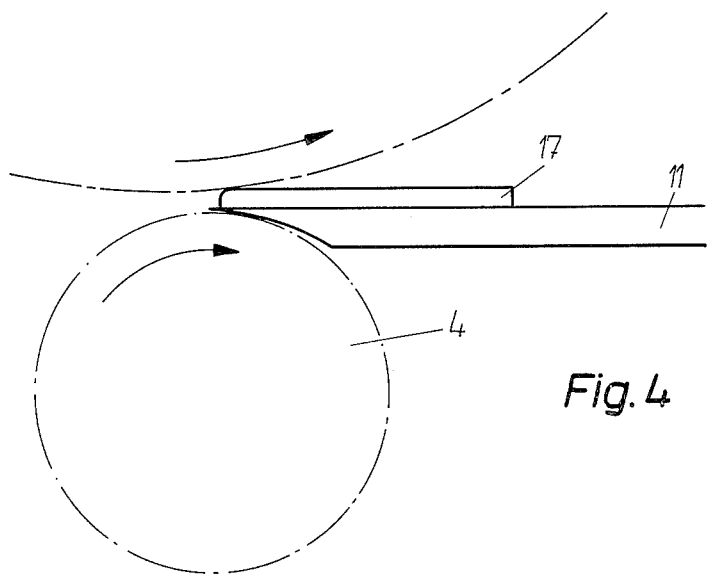

FIG. 4 is a modification over the arrangement of FIG. 3 and differs from FIG. 3 by the employment of a supporting plate.

The apparatus according to the present invention is characterized primarily by the provision of a corrugated roller arranged along the cutting edge of the cutting knife and rotatable in a direction toward the cutting edge.

More specifically, in order to be able by means of the said roller to guide the cutting edge and to prevent the same from cutting into the rubber product proper, such as a tire, the said roller is arranged in front of the cutting edge of the cutting knife in such a way that the circumferential surface of the roller extends into the extended plane of the cutting knife and, more specifically, into the said plane passing through the front edge of said cutting knife. With this arrangement, the roller must first slightly press in the surface of the tire or the like in order to assure a low cutting location of the squeeze-out for the knife.

To make sure that the knife will cut the squeeze-out at a certain distance from the rubber product proper, the front side of the cutter may also be provided with an enlargement or a support adapted in a resilient manner, for instance, by spring means to follow the surface of the rubber product and to move the cutting line toward or away from the rubber product.

Referring now to the drawings in detail, the arrangement shown therein comprises a roller 4 and a knife 11 which are preferably carried by a common supporting member which may also carry the drive for the roller. More specifically, a supporting member 1 is carried by and fixedly connected to a support 2, for instance, by welding. One end of supporting member 1 carries roller 4 which is driven through pulleys 4a, 4b and a belt 6 by means of a drive motor 5 which may be an electric motor. The central portion of supporting member 1 carries a plate 8 which is adjustably secured to supporting member 1 by means of a bolt 7 and nuts 9. As will be seen from the drawing, plate 8 is provided with a step 10 in which cutting knife 11 is displaceably mounted. To this end, a screw 12 having its head countersunk in knife 11 extends through an oblong opening 8a in plate 8 whereby knife 11 may be adjusted relative to plate 8. The adjustment of knife 11 with regard to plate 8 may be effected by horizontal screws 13 extending through the rear portion of plate 8 and adapted to engage the rear end of knife or cutting blade 11. The respective position of adjusting screws 13 may be secured in well-known manner by counter nuts 14. It will thus be appreciated that when screws 12 are loosened, a fine adjustment can be effected by screw bolts 13. While in this way the knife or cutting blade is adjustably connected to supporting member 1, roller 4 and motor 5 are nondisplaceably connected to supporting member 1.

Roller 4 comprises a core 4c into which webs 15, preferably of helical shape, are inserted. These webs are connected to said roller and are ground so as to co-operate with the cutting edge of knife 11 for exerting a cutting-off effect similar to that of scissors. The pitch of the webs or cutting blades 15 is preferably selected between 60 and 75° so as to make sure that one blade 15 will always engage the cutting edge of knife 11 and will prevent the squeeze-out from deviating laterally during the cutting operation proper.

It is advantageous so to design the bottom side of the knife from the edge thereof that it will conform to the circumferential surface of roller 4 thereby permitting movement of the cutting edge of knife 11 as closely as possible to the surface of roller 4. This greatly favors the cutting-off of the squeeze-out on the rubber product to be trimmed. If desired, the roller may be provided with transversely extending grooves which are wound in the manner of a screw thread so that always a portion of the peripheral surface of the roller will engage the bottom surface of the knife. However, the provision of webs 15, as mentioned above, is more advantageous inasmuch as it permits making said webs of a material different from the material of which the roller is made. These webs may be made of a material harder than the knives, for instance of hardened steel or cutting metal whereby the wear of the roller will be reduced and the knives are subjected to wear. This, however, is preferable inasmuch as the knives can much easier be exchanged and reground than the roller.

Roller 4 may be slightly pressed by a spring force against the adjacent side of the cutting edge of knife 11. This force may come from the resilience of member 1. Inversely, it is also possible by a suitable selection of material for the roller or its webs to cause said roller 4 to maintain knife 11 in a continuously sharp condition by causing said roller to grind off from knife 11 as much as is worn off from the knife by cutting off the respective squeeze-out. This is a known self sharpening action such as occurs in reel type lawn mowers.

According to FIGS. 3 and 4, the cutting line of knife 11 is held at a certain spaced relationship with regard to the surface of the rubber product T as may be necessary in order not to cut into intentional protrusions such as lettering, profile edges or the like. In conformity with FIG. 3, roller 4, indicated by a dot-dash circle, serves to maintain a certain distance between the respective closest portion of rubber product T from the cutting edge of knife 11. The same effect is, in conformity with FIG. 4, obtained by a plate 17 on cutting knife 11, or knife 11 could be provided with a corresponding enlargement. Plate 17 may have a thickness of, for instance 0.3 millimeter to maintain a corresponding spacing of the cutting edge from the closest surface portion proper of the rubber product to be trimmed.

It is, of course, to be understood that the present invention is, by no means, limited to the particular arrangements shown in the drawings but also comprises any modifications within the scope of the appended claims.

What we claim is:

1. An apparatus for cutting off the squeeze-out on molded rubber products, especially pneumatic vehicle tires, which includes: cutting blade means adapted to be directed in tangential direction with regard to the molded rubber product from which the squeeze-out is to be cut off with one end of said blade means adjacent said product, said cutting blade means having a substantial planar top surface adjacent said product, said cutting blade means having a cutting edge at the said one end and having its front face at said one end receding from the cutting edge at the top surface thereof to the bottom surface of said cutting blade means, roller means arranged in front of and generally beneath said front face of said cutting blade means and having a portion of said roller means adjacent said cutting edge extend upwardly beyond the extension of the top surface of said cutting blade means, said roller means having its peripheral surface disposed closely adjacent said cutting edge and front face of said cutting blade means, means drivingly connected to said roller means and operable to rotate the same so as to move said peripheral surface of said roller means in such a direction that said peripheral surface meets said cutting edge prior to said front face, means resiliently urging said roller means toward said front face of said cutting blade means, and depressions in the peripheral surface of said roller means extending in substantially longitudinal direction thereof, said depressions leaving longitudinal ribs on said roller means for cooperation with said cutting edge to shear off squeeze-out from said product.

2. An apparatus for cutting off the squeeze-out of molded rubber products, especially pneumatic vehicle tires, which includes: cutting blade means positioned in tangential direction with regard to the molded rubber product from which the squeeze-out is to be cut off and with one end of said cutting blade means adjacent said product, said cutting blade means having a first surface facing toward said product and a second surface facing away from said product, said cutting blade means being provided with a cutting edge at said one end adjacent said first surface and also provided with a portion receding from said cutting edge to said second surface, roller means having a grooved peripheral surface and arranged at said one end of said cutting blade means and therebeneath for cooperation with said cutting blade means for cutting off squeeze-out from said molded rubber product, driving means connected to said roller means and operable to rotate the same so as to move said peripheral surface of said roller means in such a direction that said peripheral surface meets said cutting edge prior to said receding portion, supporting means common to said cutting blade means and said roller means and including means resiliently urging said roller means toward said cutting blade means and also including means for simultaneously adjusting said cutting blade means and said roller means, and means for adjusting said cutting blade means independently of said roller means.

3. An apparatus for removing the squeeze-out of rubber products, especially pneumatic tires, produced in molds which comprises a knife having a cutting edge at one end and adapted to be directed tangentially to the surface of the rubber product from which the squeeze-out is to be removed and with said one end of said knife adjacent said surface of said rubber product, a roller provided with ribs extending in substantially longitudinal direction thereof and engaging the said one end of the knife and rotatable against the cutting edge to shear off rubber therebetween, driving means connected to said roller, and a longitudinal supporting member supported in the central portion thereof and having said cutting knife supported on the said central portion thereof, the driving means mounted on one end of said supporting member and the roller mounted on the other end of said supporting member, said supporting member being resilient in the region between said central portion thereof and said other end thereof to support said roller resiliently with respect to said knife.

4. An apparatus for cutting off the squeeze-out of molded rubber products, especially pneumatic tires, which includes: cutting blade means adapted to be arranged tangentially with regard to the molded rubber product from which the squeeze-out is to be cut off so that one end of said cutting blade means is adjacent said product, said cutting blade means having a first surface adapted in cutting position of said cutting blade means to face toward said product and a second surface facing in the opposite direction with regard to said first surface, said cutting blade means being provided with a cutting edge at said one end at said first surface, roller means rotatably arranged adjacent said one end of said cutting blade means and having its peripheral surface disposed closely adjacent said cutting edge, said cutting blade means also being provided with a surface portion receding from said cutting edge away from said roller means to said second surface, means drivingly connected to said roller means and operable to rotate the same in such a direction that said peripheral surface of said roller means meets said cutting edge prior to said receding portion, means resiliently urging said roller means towards said receding portion and said cutting edge, said peripheral surface of said roller means being provided with depressions extending substantially in longitudinal direction of said roller means and leaving longitudinal ribs on said roller means for cooperation with said cutting edge to shear off squeeze-out from said product.

5. An apparatus according to claim 4, in which that portion of said first surface which is adjacent said cutting edge is covered by a plate mounted thereon.

6. An apparatus according to claim 4, in which said first surface of said cutting blade means is provided with protrusion means adapted to extend towards the rubber product from which the squeeze-out is to be removed to such an extent as to permit cutting off the squeeze-out while preventing direct contact between the rubber product proper and said cutting edge.

References Cited by the Examiner
UNITED STATES PATENTS

| | | | |
|---|---|---|---|
| 1,658,852 | 2/1928 | Messer | 157—13 |
| 1,945,883 | 2/1934 | Connelly | 157—13 |
| 2,023,575 | 12/1935 | Connelly | 157—13 |
| 2,099,458 | 11/1937 | Althen | 157—13 |

GRANVILLE Y. CUSTER, Jr., *Primary Examiner.*